United States Patent [19]

Friedemann et al.

[11] 4,361,659
[45] Nov. 30, 1982

[54] ADHESIVES AND COATING MATERIALS BASED UPON ALKALI METAL SILICATE SOLUTIONS

[75] Inventors: Wolfgang Friedemann, Neuss; Bernhard Laut, Erkrath, both of Fed. Rep. of Germany

[73] Assignee: Henkel Kommanditgesellschaft auf Aktien, Düsseldorf-Holthausen, Fed. Rep. of Germany

[21] Appl. No.: 265,639

[22] Filed: May 20, 1981

[30] Foreign Application Priority Data

Jun. 2, 1980 [DE] Fed. Rep. of Germany ....... 3020864

[51] Int. Cl.³ .............................................. C08L 25/14
[52] U.S. Cl. ........................................ 523/220; 524/425; 524/426; 106/74
[58] Field of Search ............... 260/29.6 R; 106/74; 524/425, 426, 427

[56] References Cited

U.S. PATENT DOCUMENTS 3,926,657 12/1975 McConnell ........................ 428/222
4,153,591 5/1979 Yoshida et al. ................ 260/29.6 R

FOREIGN PATENT DOCUMENTS 2311745 9/1974 Fed. Rep. of Germany .
2219130 9/1974 France .
2295103 7/1976 France .
2001333 1/1979 United Kingdom .

OTHER PUBLICATIONS

Chemical Abstracts, vol. 90, 1979, 7770t (Japanese Patent Application No. 78/35091).

*Primary Examiner*—Joseph L. Schofer
*Assistant Examiner*—N. Sarofim
*Attorney, Agent, or Firm*—Hammond & Littell, Weissenberger and Muserlian

[57] ABSTRACT

This invention relates to an adhesive composition based upon an aqueous solution of alkali metal silicate with a content of powdered inorganic filler and optionally organic polymer, which comprises an aqueous alkali metal silicate solution containing:

(a) from about 25 to 50 percent by weight of dispersed crystalline calcium carbonate;
(b) from about 2 to 10 percent by weight of quartz powder with a particle size of up to about 15 μm and a specific surface area of at least about 3.5 m²/gm; and
(c) from 0 to about 24 percent by weight of a 50 percent by weight stable, aqueous dispersion of an alkali-resistant organic polymer based upon acrylate, styrene/acrylate, styrene/butadiene, or a mixture thereof based on the weight of the total composition.

10 Claims, No Drawings

ADHESIVES AND COATING MATERIALS BASED UPON ALKALI METAL SILICATE SOLUTIONS

FIELD OF THE INVENTION

This invention is directed to adhesives and coating materials based upon aqueous alkali metal silicate solutions. More particularly, this invention is directed to adhesives and coating materials based upon alkali metal silicate solutions and having powdered inorganic fillers and optionally organic polymers and to the use of such materials for the gluing and/or coating of mineral fiber boards.

BACKGROUND OF THE INVENTION

Adhesives and/or coating materials—referred to hereinafter as adhesives—based upon aqueous alkali metal silicate solutions, that is, water glass solutions, have been known for a long time and are used on a large scale for many different purposes. Such adhesives are used, for example, for the preparation of coating materials, paints, and putties as well as for the gluing of wood, paper, ceramics, and mineral insulating materials.

Such adhesives are also used especially for the preparation of sheets or boards of mineral fiber laminated with metal foils that are preferred for use in the construction industry as insulating or sound-proofing materials.

Problems are frequently encountered when using and processing such adhesives, which problems may be caused, on the one hand, by a too early hardening or by an undesirable increase in the viscosity of the adhesive and, on the other hand, by the precipitation of fillers contained in the adhesive. Such effects considerably reduce the storage stability of the adhesives. An additional problem, particularly in connection with the last-mentioned application, is the water-resistance of the adhesives after they have been dried.

Adhesives or coating materials based upon water glass solutions that also contain clay minerals, such as kaolin, clay, or talc, as well as oxides or carbonates of the alkaline earth metals or of zinc, oxides or hydroxides of aluminum, and/or barium sulfate are known from the German Published Application (DE-AS) No. 24 60 543. Such compounds are suitable, for example, for the coating of mineral fiber substrates and must have characteristics of being only slightly brittle, having good compatibility with mineral fibers, as well as being water-resistant.

In contrast, German Published Application (DE-OS) No. 27 29 194 discloses that a content of oxides, hydroxides, and carbonates in such compounds considerably reduces the storage stability of the compounds since the content causes a strong increase in the viscosity as well as separations, which lead to the settling of the solids in a pasty mass that is very difficult to return to its original consistency, if at all. Thus, German Published Application (DE-OS) No. 27 29 194 describes adhesives and/or coating materials for mineral fibers based upon alkali metal silicate solutions that are characterized by a content of one or several materials with a mineralogical content of more than 20 percent of kaolinite as well as one or several water-soluble and alkali-resistant organic polymers. Such adhesives are said to have good storage stability, with regard to the settling of the solids, and a high water resistance of the bonds made with them.

The adhesives disclosed by each of the above-mentioned references represented an improvement of sorts to the state of the art at their respective times. However, as is demonstrated more fully below, both adhesives lack an adequate storage stability with respect to the settling out as well as the required water resistance of the obtained bond.

OBJECTS OF THE INVENTION

It is an object of the invention to provide improved adhesives.

It is also an object of the invention to provide improved adhesives based upon aqueous alkali metal silicate solutions and having powdered inorganic fillers and optionally organic polymers.

It is a further object of the invention to provide adhesive and/or coating compositions based upon aqueous solutions of alkali metal silicates having a content of powdered inorganic fillers and optionally organic polymer, which comprises an aqueous alkali metal silicate solution containing:

(a) from about 25 to 50 percent by weight of dispersed crystalline calcium carbonate;
(b) from about 2 to 10 percent by weight of quartz powder with a particle size of up to about 15 μm and a specific surface area of at least about 3.5 m²/gm; and
(c) from about 0 to 24 percent by weight of a 50 percent by weight stable, aqueous dispersion of an alkali-resistant organic polymer based upon acrylate, styrene/acrylate, styrene/butadiene, or a mixture thereof, based on the weight of the total composition.

These and other objects of the invention will become more apparent in the discussion below.

DETAILED DESCRIPTION OF THE INVENTION

The present invention is directed to the development of adhesive and/or coating materials, that is, "adhesives", based upon water glass solutions, which do not have any of the disadvantages described above and are especially suitable for the gluing and/or coating of mineral fiber boards. It has been found that a combination of inorganic fillers, optionally with the addition of an aqueous dispersion of certain organic polymers, offers the solution to the problem of overcoming the disadvantages of the prior art compositions.

Therefore, the subject of the invention is adhesives and/or coating materials based upon aqueous alkali metal silicate solutions having a content of powdered inorganic fillers and optionally organic polymers, which comprises an aqueous alkali metal silicate solution containing:

(a) from about 25 to 50 percent by weight of dispersed crystalline calcium carbonate;
(b) from about 2 to 10 percent by weight of quartz powder having a particle size of up to about 15 μm and a specific surface area of at least about 3.5 m²/gm; and
(c) from 0 to about 24 percent by weight of a 50 percent by weight stable, aqueous dispersion of an alkali-resistant organic polymer based upon acrylate, styrene/acrylate, styrene/butadiene, or a mixture thereof, based upon the weight of the total composition.

It was surprising to find that the adhesives according to the invention are distinguished by advantageous application technological properties with respect to the storage stability as well as the water-resistance of the bond obtained. Because of the combination according to the invention of crystalline calcium carbonate and quartz powder with a large specific surface area within the specified range, such adhesives do not tend to exhibit interfering separation phenomena, even after extended storage periods. On the contrary, the undesirable settling out of the solids is largely suppressed. This prevents gluing or coating results that cannot be reproduced, which may be due, for example, to a disadvantageous, too early absorption of the liquid adhesive into highly absorbent substrates. Neither do such adhesives exhibit significant changes with respect to an undesirable increase in viscosity.

These advantageous properties of the adhesives are the more surprising as the materials according to the invention may contain a considerable amount of calcium carbonate, based on the weight of the total composition. Also, it should be emphasized that clay minerals such as kaolin, clay, or calcium, for example, are not included among the components of the adhesives according to the invention.

The adhesives according to the invention preferably contain from about 30 to 40 percent by weight of dispersed crystalline calcium carbonate, based on the weight of the total composition. In this context the term "dispersed" and "powdered" describe particle sizes of the calcium carbonate in the range from about 1 to 45 $\mu$m, particularly from about 1 to 25 $\mu$m. The determination of the particle size may be carried out with a Coulter Counter ®, for example. The use of crystalline calcium carbonate, especially metamorphous calcite, has proven advantageous for the prevention of a premature age-hardening of the adhesive.

Also preferred is a content of from about 4 to 6 percent by weight of quartz powder, based on the weight of the total composition, in the adhesives according to the invention. The specific surface area of the quartz powder may be determined by, for example, the method by Brunauer, Emmett, and Teller (BET-method).

If an aqueous dispersion of organic polymers is present, it is further preferred that the adhesives according to the invention contain from about 2 to 5 percent by weight, based on the weight of the total composition, of a stable, aqueous dispersion of an alkali-resistant organic polymer based upon acrylate, styrene/acrylate, styrene/butadiene or a mixture thereof.

Organic polymers suitable for this purpose are water-insoluble commercial homopolymers and/or copolymers of acrylic acid esters, styrene/acrylate copolymers, or styrene/butadiene copolymers that are offered, for example, under the names Acronal ® (available from BASF) or Mowilith ® (available from Hoechst). The water-resistance of the bonds or of the dried coating materials obtained with the adhesives according to the invention can be considerably improved by such an addition. However, an addition of organic polymers generally can be avoided in the interest of greater flame resistance.

The adhesive compositions according to the invention are based upon aqueous alkali metal silicate solutions, as mentioned above. This means that sodium water glass as well as potassium water glass, or the respective mixtures of water glass, can be used as substances according to the invention. When mixtures of water glass are used, the mixing ratio may be varied within a broad range. For example, the alkali metal silicate solution may contain from about 2 to 98 percent by weight of potassium silicate solution. However, a composition in which the sodium silicate solution lies within the range of from about 10 to 40 percent by weight and the potassium silicate solution lies within the range of from about 90 to 60 percent by weight, is preferred for this purpose.

In view of the goals of the invention, the adhesive compositions according to the invention perferably contain from about 30 to 80 percent by weight, based upon the weight of the total composition, of an aqueous alkali metal silicate solution having a solids content of from about 28 to 48 percent by weight, such as an aqueous sodium and/or potassium silicate solution, the sodium silicate solution having a ratio by weight of from about 2.6:1 to 3.9:1 for $SiO_2/Na_2O$ as well as a solids content of from about 28 to 45 percent by weight, and the potassium silicate solution having a weight ratio of from about 2:1 to 2.6:1 for $SiO_2/K_2O$ as well as a solids content of from about 28 to 40 percent by weight.

Within the ranges given above, an especially preferred embodiment of adhesive composition of the invention comprises a content of from about 40 to 60 percent by weight, based on the weight of the total composition, of a sodium and/or potassium silicate solution, the sodium silicate solution having a weight ratio of from about 3.3:1 to 3.7:1 for $SiO_2/Na_2O$ as well as a solids content of from about 29 to 37 percent by weight, and the potassium silicate solution having a weight ratio of from about 2.2:1 to 2.6:1 for $SiO_2/K_2O$ as well as a solids content of from about 28 to 35 percent by weight.

The alkali metal silicate solution may be stabilized—that is, a precipitation of $SiO_2$ may be prevented—by an addition, if desired, of a water-soluble quaternary and/or polyquaternary nitrogen compound that contains at least one alkyl radical without hydroxyl groups at the quaternary nitrogen atom. Stabilizers of this type are described in German Published Application (DE-OS) No. 16 67 538, for example.

With respect to the water-resistance of the bond to be obtained, the addition of up to about 2 percent by weight of lithium hydroxide, based on the weight of the total composition, to the adhesives may be advantageous. Furthermore, the adhesives may contain up to about 1 percent by weight of dispersed, alkali-resistant color pigments that are inactive in water glass, such as those normally used for these purposes. Suitable pigments include, for example, titanium dioxide, iron oxide, chromium oxide, barium chromate, cobalt green, or cobalt blue as well as cadmium selenide or cadmium sulfide.

The adhesives according to the invention can be prepared without problems by mixing the individual components. As a rule, the alkali metal silicate solution, or the mixture of sodium and potassium silicate solution, is placed in a vessel, and the calcium carbonate as well as the quartz powder are added with agitation. If desired, the aqueous dispersion of the organic polymers is stirred into this mixture. The adhesive obtained by this process has excellent storage stability under air exclusion.

The adhesive compositions according to the invention preferably are used for the gluing and/or coating of mineral fiber boards. A particular application is the covering of mineral fiber boards or sheets with metal foils. In addition, the adhesives according to the invention can be used also for all those purposes for which adhesives based upon aqueous alkali metal silicate solutions are normally used.

The following examples are intended to illustrate the invention and should not be construed as limiting the invention thereto.

EXAMPLES

Example 1

An adhesive according to the invention had the following composition:
(a) 50 percent by weight of an aqueous alkali metal silicate solution containing: 45.5 percent by weight of potassium silicate solution with a weight ratio of 2.6 for $SiO_2/K_2O$ and a solids content of 28.5 percent by weight, and 30 percent by weight of sodium silicate solution with a weight ratio of 3.3 for $SiO_2/Na_2O$ and a solids content at 36 percent by weight;
(b) 36 percent by weight of crystalline calcium carbonate with particle sizes ranging from about 1 to 25 μm;
(c) 4 percent by weight of quartz power with particle sizes up to about 15 μm and a specific surface area of 4.5 m²/gm;
(d) 5 percent by weight of a 50 percent by weight aqueous dispersion of polyacrylic acid ester; and
(e) 5 percent by weight of deionized water.

The adhesive was obtained, as described above, by the addition of the inorganic solids as well as the dispersion of the organic polymers, with agitation, into the water glass solution. The agitation of the finished mixture was continued until it was completely homogenized. The viscosity of the adhesive was checked with a rotational viscosimeter (Rotavisko by Haake KG, Berlin) after its preparation as well as after a storage period of four weeks in a closed container. It remained practically unchanged.

The separation behavior of the adhesive was tested in the following manner:

A sample of 250 ml of the well homogenized adhesive is transferred to a graduated cylinder and the sedimentation of solids in the closed cylinder is observed for a period of four weeks. The onset of sedimentation of the solids manifests itself in a clearly visible phase separation into a clear supernatant solution, on the one hand, and the settling solids component, on the other hand, while the use of the graduated cylinder permits the reading of the respective amounts (in ml). This test method may require—for example, in the case of copiously settling fillers—the reading of the proportion of the respective phase hourly or at even shorter intervals; otherwise a daily control is adequate.

In the case of the present adhesive according to the invention, a phase separation into 10 ml of clear supernatant solution and 240 ml of remaining adhesive containing filler was observed after a period of 24 hours. No other significant change was observed, even after an extended testing period.

The water-resistance of an adhesive film obtained with the adhesive according to the invention was tested by the following method: A layer of adhesive approximately 1 mm thick is applied with an applicator to an aluminum foil measuring 10×10 cm, and the foil is stored at room temperature for 24 hours to allow the adhesive to age. Subsequently, the foil is placed in a dish filled with water—with the adhesive film facing up—and rinsed with running water. The stream of water should not hit the adhesive film directly in this operation. Dissolution of the adhesive film due to its lacking water-resistance is tested manually, that is, by light rubbing with a finger over the film. This test is performed at intervals of 15 minutes during the first hour, and then hourly.

An adhesive film formed with the adhesive according to the invention proved to be stable and water-resistant in this test, even after 6 hours.

Comparison Example A

An adhesive was prepared according to Example 2 of the German Published Application (DE-AS) 24 60 543 for comparison. The adhesive had the following composition:
(a) 89.5 percent by weight of sodium silicate with a molar ratio of 3.3:1 for $SiO_2/Na_2O$ and a solids content of 25 percent by weight;
(b) 8 percent by weight of kaolin (particle size <10 μm); and
(c) 2.5 percent by weight of zinc oxide (particle size <1 μm).

The testing of an adhesive film prepared with this adhesive for water resistance—analogously to Example 1—led to the complete dissolution of the coating after only 15 minutes. The testing of the settling behavior—also analogously to Example 1—resulted in a phase separation of 160 ml supernatant clear solution and 90 ml solids with remaining adhesive, after a period of 24 hours.

Comparison Example B

An adhesive corresponding to Example 2 of German Published Application (DE-OS) No. 27 29 194 was prepared for comparison. The adhesive had the following composition:
(a) 79.5 percent by weight of sodium silicate with a weight ratio of 3.3:1 for $SiO_2/Na_2O$ and a solids content of 36.5 percent by weight;
(b) 10 percent by weight of a 6 percent solution of polymer acrylate;
(c) 9 percent by weight of kaolin; and
(d) 1.5 percent by weight of sodium aluminate.

The testing for water resistance of an adhesive film produced with this adhesive—analogously to Example 1—led to the complete dissolution of the coating after 15 minutes. The testing of the settling behavior—also analogously to Example 1—resulted in a phase separation of 150 ml supernatant solution and 100 ml solids, after a period of 24 hours.

A comparison of the two preceding comparison examples with Example 1 shows the considerably improved settling behavior—and thus the improved storage stability—of the adhesive according to the invention as well as the considerably increased water resistance of the coating obtained with this adhesive.

Further adhesive formulations according to the invention are described in the examples below. Each such adhesive had relatively good properties with respect to settling behavior and water resistance.

Example 2

(a) 50 percent by weight of an aqueous alkali metal silicate solution containing: 45.5 percent by weight of potassium silicate solution with a weight ratio of 2.6 for $SiO_2/Na_2O$ and a solids content of 28.5 percent by weight, and 30 percent by weight of sodium silicate solution with a weight ratio of 3.3 for $SiO_2/Na_2O$ and a solids content of 36 percent by weight;
(b) 34 percent by weight of crystalline calcium carbonate with particle sizes in the range from about 1 to 25 μm;

(c) 6 percent by weight of quartz powder with particle sizes of up to about 15 μm and a specific surface area of 4.5 m²/gm;
(d) 5 percent by weight of a 50 percent by weight aqueous dispersion of polyacrylate; and
(e) 5 percent by weight of deionized water.

Example 3

(a) 53 percent by weight of an aqueous alkali metal silicate solution containing: 45.5 percent by weight of potassium silicate solution with a weight ratio of 2.6 for $SiO_2/K_2O$ and a solids content of 28.5 percent by weight and 30 percent by weight of sodium silicate solution with a weight ratio of 3.3 for $SiO_2/Na_2O$ and a solids content of 36 percent by weight;
(b) 30 percent by weight of crystalline calcium carbonate with particle sizes in the range from about 1 to 25 μm;
(c) 10 percent by weight of quartz powder with particle sizes of up to about 15 μm and a specific surface area of 3.5 m²/gm;
(d) 2 percent by weight of a 50 percent by weight aqueous dispersion of polyacrylate; and
(e) 5 percent by weight of deionized water.

Example 4

(a) 40 percent by weight of an aqueous sodium silicate solution with a weight ratio of 2.8 for $SiO_2/Na_2O$ and a solids content of 45 percent by weight;
(b) 27.9 percent by weight of crystalline calcium carbonate with particle sizes in the range from about 1 to 25 μm;
(c) 3.1 percent by weight of quartz powder with particle sizes up to about 15 μm and a specific surface area of 3.5 m²/gm;
(d) 24 percent by weight of a 50 percent by weight aqueous dispersion of styrene/acrylate copolymer; and
(e) 5 percent by weight of deionized water.

Example 5

(a) 70 percent by weight of an aqueous potassium silicate solution with a weight ratio of 2.6 for $SiO_2/K_2O$ and a solids content of 29.1 percent by weight;
(b) 28 percent by weight of crystalline calcium carbonate with particle sizes in the range from about 1 to 25 μm; and
(c) 2 percent by weight of quartz powder with particle sizes of up to about 15 μm and a specific surface area of 3.5 m²/gm.

While the present invention has been illustrated with the aid of certain specific embodiments thereof, it will be readily apparent to others skilled in the art that the invention is not limited to these particular embodiments, and that various changes and modification may be made without departing from the spirit of the invention or the scope of the appended claims.

We claim:

1. An adhesive composition based upon an aqueous solution of alkali metal silicate with a content of powdered inorganic filler and optionally organic polymer, which comprises:
    (a) from about 30 to 80 percent by weight of a sodium and/or potassium silicate solution having a solids content of from about 28 to 48 percent by weight, the sodium silicate solution having a weight ratio of from about 2.6:1 to 3.9:1 for $SiO_2/Na_2O$ and the potassium silicate solution having a weight ratio of from about 2:1 to 2.6:1 for $SiO_2/K_2O$;
    (b) from about 25 to 50 percent by weight of dispersed crystalline calcium carbonate having a particle size of from about 1 to 45 μm;
    (c) from about 2 to 10 percent by weight of quartz powder with a particle size of up to about 15 μm and a specific surface area of at least about 3.5 m²/gm; and
    (d) from 0 to 24 percent by weight of a 50 percent by weight stable, aqueous dispersion of an alkali-resistant organic polymer based upon acrylate, styrene/acrylate, styrene/butadiene or a mixture thereof,
based on the weight of the total composition.

2. The adhesive composition of claim 1, wherein the sodium silicate solution has a solids content of from about 28 to 45 percent by weight and the potassium silicate solution has a solids content of from about 28 to 40 percent by weight.

3. The adhesive composition of claim 1, wherein component (b) comprises from about 30 to 40 percent by weight of dispersed calcium carbonate.

4. The adhesive composition of claim 3, wherein component (b) comprise metamorphous calcite.

5. The adhesive composition of claim 3, wherein the particle size of the dispersed calcium carbonate is from about 1 to 25 μm.

6. The adhesive composition of claim 1, wherein component (c) comprises from about 4 to 6 percent by weight of quartz powder.

7. The adhesive composition of claim 1, wherein component (d) comprises from about 2 to 5 percent by weight of a stable, aqueous dispersion of an alkali-resistant organic polymer.

8. The adhesive composition of claim 1 which comprises from about 40 to 60 percent by weight of a sodium and/or potassium silicate solution, the sodium silicate solution having a weight ratio of from about 3.3:1 to 3.7:1 for $SiO_2/Na_2O$ as well as a solids content of from about 29 to 37 percent by weight, and the potassium silicate solution having a weight ratio of from about 2.2:1 to 2.6:1 for $SiO_2/K_2O$ as well as a solids content of from about 28 to 35 percent by weight.

9. The adhesive composition of claim 1 which comprises from 0 to about 2 percent by weight of lithium hydroxide.

10. A method for adhering coatings to mineral fiber board which comprises applying an effective amount of the adhesive composition of claim 1 to the mineral board or the coating.

* * * * *

UNITED STATES PATENT AND TRADEMARK OFFICE
CERTIFICATE OF CORRECTION

PATENT NO. : 4,361,659

DATED : November 30, 1982

INVENTOR(S) : WOLFGANG FRIEDEMANN et al.

It is certified that error appears in the above-identified patent and that said Letters Patent is hereby corrected as shown below:

Column 5, line 15, "content at" should read -- content of --.

Claim 1, line 19, "24" should read -- about 24 --.

Signed and Sealed this

First Day of March 1983

[SEAL]

Attest:

GERALD J. MOSSINGHOFF

Attesting Officer     Commissioner of Patents and Trademarks